July 16, 1929.   R. E. MITTON   1,721,349
FLUID VALVE
Filed March 16, 1928
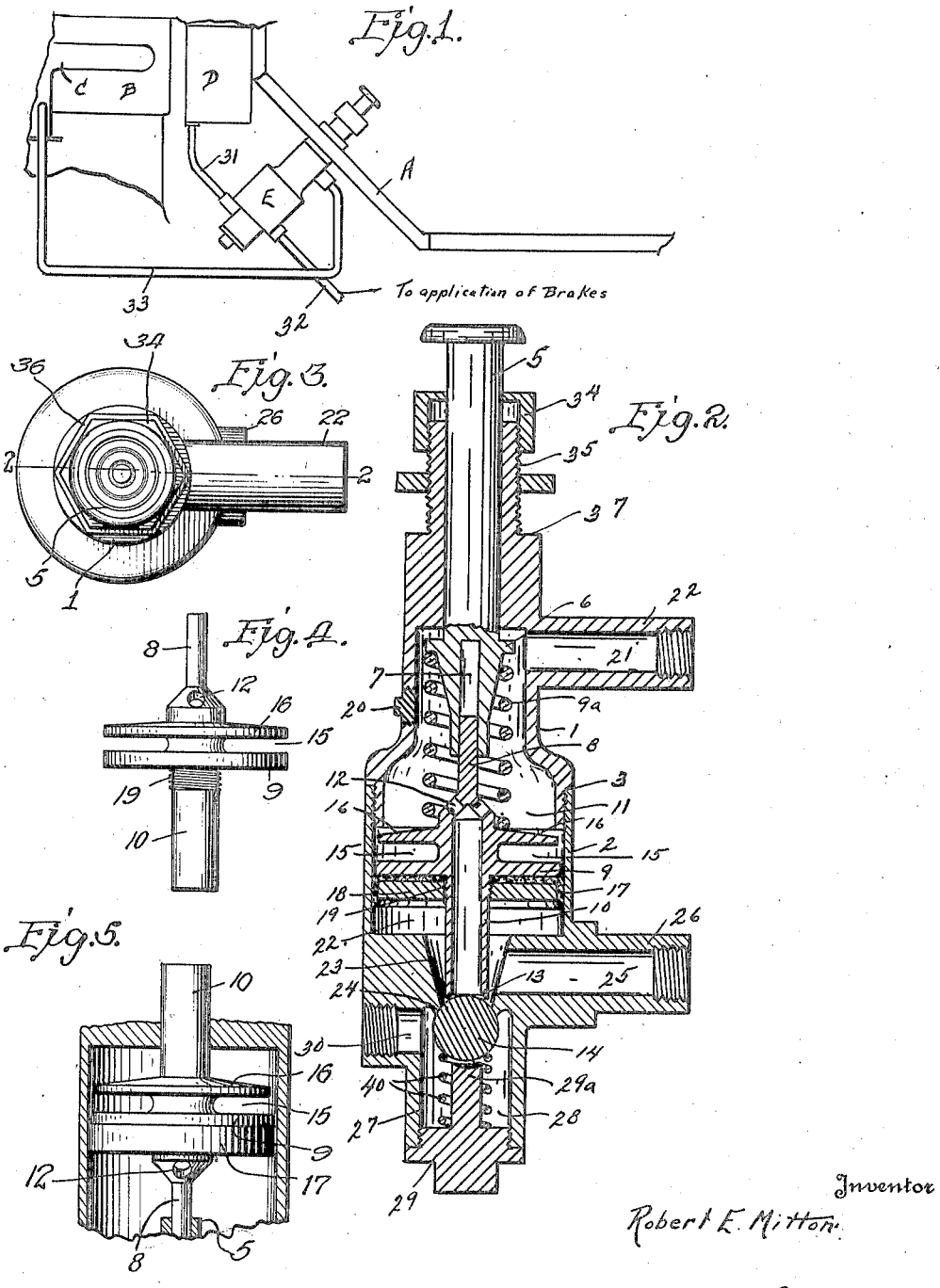
Inventor
Robert E. Mitton.
By R. M. Thomas
Attorney Patented July 16, 1929.

1,721,349

UNITED STATES PATENT OFFICE.

ROBERT E. MITTON, OF SALT LAKE CITY, UTAH.

FLUID VALVE.

Application filed March 16, 1928. Serial No. 262,207.

My invention relates to fluid valves, and has for its object, to provide an economical, efficient floor board valve which will be self lubricating in its action and which will eliminate many expensive parts in installation.

A further object is to provide a silently operated valve for the control of fluids, for use in automobile braking systems, and a valve which is odorless because there are no gases allowed to escape into the tonneau of the automobile.

A still further object is to provide a valve which will be controlled by the foot of the operator acting directly upon the control stem of the valve and in which the muscular tension of the operator will be in direct action against the springs of the valve and the pressure of the air therein.

A still further object is to provide a valve and system of connecting said valve to the floor boards of the automobile so that the operator will have his foot acting directly upon the valve without connecting levers and which valve will be so connected with the intake manifold that when the valve is released the suction of the manifold will automatically tend to release the brakes with suction from the manifold thereby removing in part or in whole the necessity of come-back or release springs in the braking system, and also providing a more instantaneous release of the brakes as operator may desire.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a diagrammatic side elevation of the device, shown installed on the floor board of an automobile. Figure 2 is a section on line 2—2 of Figure 3. Figure 3 is an end view of the valve. Figure 4 is a section of the piston and the oiling portion thereof in elevation. Figure 5 is section of a portion of the valve showing the piston inverted from the one shown in Figure 2, to illustrate the use of this type piston in an upright valve.

In the use of fluids and especially air in the braking system of automobiles it has long been an obstacle to make a silently operated system in which the escaping air did not make a hissing noise when the brakes were released. it has also been a big problem to make a valve which will be self lubricating during its action in the control of air. The present invention eliminates all of these obstacles and provides a valve for use on automobiles which will not only eliminate the undesirable features but gives many added features.

In the drawings I have shown the floor board of an automobile as A, the engine block as B, the intake manifold as C, the air storage tank or supply tank as D and the valve for controlling the fluid as E. The said valve is constructed as shown in Figure 2 of the drawings, of two cylindrical casings 1 and 2, threaded together at 3, with one end of the casing 1 enlarged to engage with the casing 2. Centrally through the end of said casing 1, I provide a slidable control valve stem 5, having an enlarged portion 6, medially thereon, to form a stop and also a spring base, the extreme end of the stem 5 is tapered and bored at 7 to an alignment stem 8. The said stem 8, is connected with a piston 9, and a spirng 9ª is carried between the piston 9 and the portion 6. The said piston 9 is made as shown in Figures 2 and 4 of the stem 5, having a tubular piston 10 on the lower side thereof, which tubular piston is in open connection with the chamber 11, above the piston, by connection therewith of the ports 12, in the stem 8. The lower end of the tubular piston 10, is ground to form a valve seat 13, in which a ball valve 14 is adapted to seat when closing the valve. The said piston is formed with an oil channel 15 therearound, and with the top side 16 of the piston 9 sloping downward and spaced from the wall of the chamber 11, to allow moving oil to flow down into the channel 15. A packing cup leather 17, is secured to the piston 9, by the plate 18 being screwed onto a threaded portion 19 of the stem 10, and holding the cup against the lower side of the piston 9. An oil inlet plug 20, is provided in one side of the upper chamber 11, and an exhaust port 21, is formed through a boss 21ª on one side of the casing 1, in open connection with the said chamber 11, and is provided with suitable threads to secure lead pipes thereto. The chamber 22 below the piston 9 in the casing 2, is constricted and a tapered hole 23 formed centrally therein with the lower end thereof ground to form a valve seat 24 upon which seat the valve 14 is adapted to seat when the valve is closed. An application port 25 is bored through a boss 26 formed on one side of the casing 2 and said port is in open connection with the chamber 22 through the tapered hole 23. The lower end of the casing 2 is made in smaller diameter and is centrally bored at 27 forming a chamber 28 therein in which the valve seat 24 is the top side thereof and a plug 29 is screwed into the threads in the bore 27 to close the end thereof. A stem 29ª is formed on the inside of the plug 29 to act as a stop for the valve 14. An intake port 30 is formed in one side of the chamber 28 and is connected with the supply tank D by the pipe 31. A tension spring 40 is carried on the stem 29ª of the plug 29 and which spring bears against the ball valve 14, and normally holds the said valve seated in the valve seat 24. The application port 25 is connected with the brakes of the automobile by the pipe 32 and the exhaust port 21 is connected with the intake manifold of the automobile engine by the pipe 33.

The operation of the control valve stem 5 is or may be limited in its action by the adjustment of nut 34 which nut is screwed into threads 35 on the outer side of the upper end of the casing 1, and a nut 36 is screwed onto the said threads to secure the valve through the running board of the car between the nut 36 and a shoulder 37 of the casing 1.

The operation of my device is as follows:

With the valve installed through the running board of the car and with the pipe 31 connected with the supply tank, the pipe 33 with the intake manifold of the engine and the pipe 32 connected with the application cylinders of the brakes the device is ready for operation. The driver places his foot upon the upper end of the control stem 5 and presses downwardly the degree necessary to compress the spring 9ª and push the valve 14 away from the seat 24 allowing air to pass from the chamber 28 and through the valve seat 24 into the chamber 22 and from there through the port 25 into the pipe 32 and to the brakes. When sufficient back pressure has been built up the air acting against the piston 9 compresses the spring 9ª allowing the valve 14 to again seat in the seat 24 and opening the seat 13 in the stem 10 which action allows the air to pass through the stem 10 and the ports 12, and out the exhaust pipe 33 into the intake manifold of the engine. The passing of the air into the manifold eliminates the usual noise of exhausting air, and when the brakes have been released by the operator releasing the foot from the stem 5, the suction of the intake manifold passing through the pipe 33, the port 21, the ports 12 the stem 10 and the port 25 will draw the air from the application lines and release the brakes automatically, and as the port 13 is normally open at all times except when applying the brakes, the suction of the intake manifold will hold the brakes released at all times, which will eliminate the use of release springs on the brakes, or else will require only very light springs, instead of the usual release or come-back springs now used.

Having thus described my invention, I desire to secure by Letters Patent and claim:

1. A fluid valve of the class described comprising a casing; a piston operable in said casing; intake and exhaust ports in said casing; and an oil supply channel formed on one side of said piston adapted to hold oil therein and to supply oil to the moving parts of said piston as necessary.

2. A fluid valve comprising a casing; a piston operable in said casing; a valve seat formed in a stem on the end of said piston; a ball valve adapted to seat in said valve seat when said piston is operated; another seat formed in the end of said casing separating the space within the casing from the intake port and in which the ball valve is normally seated by the pressure of a spring; a spring to control the movement of the piston; a stem to actuate the piston through the pressure of said last mentioned spring; an oil supply channel formed on the top side of said piston; and a lock nut screwed on the top end of the said casing adapted to secure the valve through the floor board of the automobile so that the operator presses directly upon the control stem of the valve.

In testimony whereof I have affixed my signature.

ROBERT E. MITTON.